(12) United States Patent
Fabre et al.

(10) Patent No.: US 12,325,156 B2
(45) Date of Patent: Jun. 10, 2025

(54) MOLD FOR MANUFACTURING A TURBINE ENGINE FAN CASING FROM A COMPOSITE MATERIAL

(71) Applicant: SAFRAN AIRCRAFT ENGINES, Paris (FR)

(72) Inventors: Hubert Jean Marie Fabre, Moissy-Cramayel (FR); Raoul Jaussaud, Moissy-Cramayel (FR); Paul Terry, Franklin, NH (US)

(73) Assignee: SAFRAN AIRCRAFT ENGINES, Paris (FR)

( * ) Notice: Subject to any disclaimer, the term of this patent is extended or adjusted under 35 U.S.C. 154(b) by 237 days.

(21) Appl. No.: 17/917,800

(22) PCT Filed: Mar. 25, 2021

(86) PCT No.: PCT/FR2021/050520
§ 371 (c)(1),
(2) Date: Oct. 7, 2022

(87) PCT Pub. No.: WO2021/205092
PCT Pub. Date: Oct. 14, 2021

(65) Prior Publication Data
US 2023/0140261 A1 May 4, 2023

Related U.S. Application Data

(60) Provisional application No. 63/008,237, filed on Apr. 10, 2020.

(51) Int. Cl.
*B29C 33/30* (2006.01)
*B29C 70/32* (2006.01)
(Continued)

(52) U.S. Cl.
CPC ............ *B29C 33/301* (2013.01); *B29C 70/32* (2013.01); *B29C 70/462* (2013.01); *B29C 70/48* (2013.01);
(Continued)

(58) Field of Classification Search
CPC ........................ B29C 70/462; B29C 33/302
See application file for complete search history.

(56) References Cited

U.S. PATENT DOCUMENTS 5,368,799 A * 11/1994 Galli .................. B29C 33/10
264/219
2013/0087955 A1 4/2013 Plante et al.
(Continued)

FOREIGN PATENT DOCUMENTS

CN 110605545 A 12/2019
WO WO 2017/089680 A1 6/2017

OTHER PUBLICATIONS

International Search Report as issued in International Patent Application No. PCT/FR2021/050520, dated Sep. 22, 2021.

*Primary Examiner* — Virak Nguon
(74) *Attorney, Agent, or Firm* — Pillsbury Winthrop Shaw Pittman LLP

(57) ABSTRACT

A mold for manufacturing a turbomachine fan casing of composite material, includes a mandrel around which a fibrous preform of the fan casing is to be wound; countermold angular sectors assembled on the external contour of the mandrel which are intended to close the mold and to compact the fibrous preform wound on the mandrel; wherein each angular sector includes a first lateral flange positioned at the first end of the angular sectors and a second lateral flange positioned at a second end of the angular sectors, the first and second lateral flanges cooperating respectively with the second and first lateral flanges of the adjacent angular sectors. An angular sector includes a first groove formed in (Continued)

the first of second lateral flange, a first seal being positioned in the first groove, the first seal to be compressed between the first and second lateral flanges of two adjacent angular sectors.

11 Claims, 4 Drawing Sheets

(51) Int. Cl.
  *B29C 70/46* (2006.01)
  *B29C 70/48* (2006.01)
  *B29L 31/08* (2006.01)
  *F01D 25/24* (2006.01)
(52) U.S. Cl.
  CPC .......... *F01D 25/24* (2013.01); *B29L 2031/08* (2013.01); *F05D 2230/51* (2013.01); *F05D 2300/603* (2013.01)

(56) References Cited

U.S. PATENT DOCUMENTS

| | | |
|---|---|---|
| 2016/0009003 A1 | 1/2016 | Chauvin |
| 2017/0173762 A1* | 6/2017 | Chardonnet ............ F01D 5/005 |
| 2018/0370082 A1* | 12/2018 | Mathon .................. B29C 70/32 |
| 2020/0070443 A1* | 3/2020 | Sana ..................... B29C 33/485 |

* cited by examiner

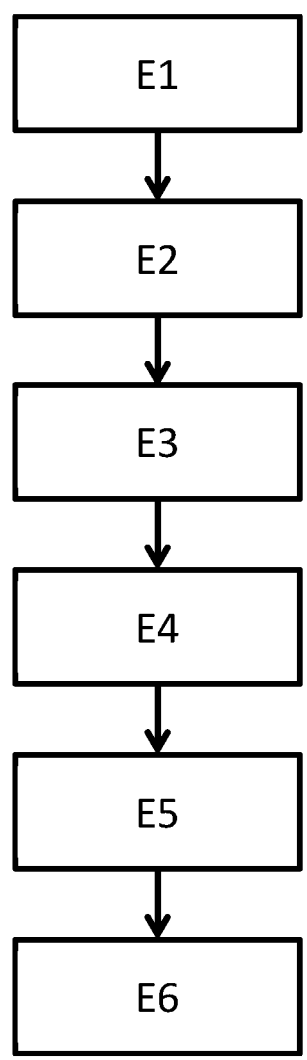

MOLD FOR MANUFACTURING A TURBINE ENGINE FAN CASING FROM A COMPOSITE MATERIAL

CROSS-REFERENCE TO RELATED APPLICATIONS

This application is the U.S. National Stage of PCT/FR2021/050520, filed Mar. 25, 2021, which in turn claims priority to U.S. patent application No. 63/008,237 filed Apr. 10, 2020. The content of these applications are incorporated herein by reference in their entireties.

BACKGROUND OF THE INVENTION

The present invention relates to the general field of manufacture of turbomachine casings, and more particularly to containment casings for aeronautical engine gas turbine fans.

In an aeronautical turbomachine, a fan casing fulfills several functions. The fan casing defines the air inlet stream of the turbomachine, supports an abradable material facing the tips of the blades of the fan, supports a possible sound wave absorption structure for the inlet acoustic treatment of the turbomachine, and incorporates or supports a containment shield.

The containment shield forms a trap retaining debris, such as ingested objects or fragments of damaged blades, projected by the effect of centrifugal force, in order to avoid these debris passing through the casing and reaching other parts of the aircraft.

It is known to construct the fan casing of composite material, and more particularly of organic matrix composite material. To this end, a fibrous texture is wound around a mandrel in order to form a fibrous preform having the shape of the casing to be manufactured. The fibrous preform is then densified by a matrix.

In order to accomplish the densification of the fibrous preform by the matrix, said fibrous preform is wound around an impregnation mandrel, then the counter-mold angular sectors are positioned around the impregnation mandrel in order to form the injection mold. A precursor material of the matrix is then injected into the mold so as to densify the fibrous preform with said precursor material of the matrix. Once the fibrous matrix is densified, the precursor material is polymerized.

Known for example is document WO2017/089680 which describes an injection mold for the manufacture of a fan casing of composite material which comprises a plurality of angular sectors positioned around an impregnation mandrel.

In document WO2017/089680, sealing between the different angular sectors is provided by T shaped parts which are attached by boltwork between each angular sector and which each compress a flat seal overlapping two adjacent angular sectors.

Such a solution has the disadvantage of requiring considerable handling time, particularly for screwing and unscrewing the boltwork attaching the T shaped part to the angular sectors.

Moreover, an injection mold of this type can encounter a stiffness problem, and particularly with stiffness at the connection between the angular sectors.

OBJECT AND SUMMARY OF THE INVENTION

The present invention therefore has as its main goal to compensate a disadvantage of this type by proposing, according to a first aspect of the invention, a mold for the manufacture of a turbomachine fan casing of composite material, and more precisely of organic matrix composite material, comprising:
- a mandrel around which a fibrous preform of the fan casing is intended to be wound;
- a plurality of counter-mold angular sectors assembled on the external contour of the mandrel, which are intended to close the mold and to compact the fibrous preform wound on the mandrel;

characterized in that each angular sector comprises, on the one hand, a first lateral flange which is positioned at a first end of the angular sectors and, on the other hand, a second lateral flange which is positioned at a second end of the angular sectors and which is opposite to the first end, the first lateral flange and the second lateral flange being configured to cooperate respectively with the second lateral flange and the first lateral flange of the adjacent angular sectors, at least one angular sector comprising a first groove formed in at least one of the first lateral flange and the second lateral flange, a first seal being positioned in said first groove, said first seal being configured to be compressed between the first lateral flange and the second lateral flange of two adjacent angular sectors.

The mold can also comprise the following additional features, which can be taken alone or in combination according to technically possible combinations:
- each angular sector comprises a front flange and a rear flange which are configured to cooperate respectively with an upstream flange and a downstream flange of the mandrel, the upstream flange and the downstream flange comprising respectively a second groove and a third groove, a second seal and a third seal being respectively positioned in the second groove and the third groove, said second seal being configured to be compressed between the upstream flange of the mandrel and the front flange of the angular sectors, said third seal being configured to be compressed between the downstream flange of the mandrel and the rear flange of the angular sectors, the first groove leading, on the one hand, into the second groove and, on the other hand, into the third groove;
- the mold comprises a first group of angular sectors for which the first groove is formed on the first lateral flange and on the second lateral flange, and a second group of angular sectors for which the first lateral flange and the second lateral flange are smooth, one angular sector of the first group being positioned between two angular sectors of the second group;
- the first groove is formed on the first flange of each angular sector;
- the first groove comprises an undulated shape;
- the first groove is crenelated, the first groove comprising, on the one hand, a plurality of slots directed radially inward and, on the other hand, a plurality of slots directed radially outward;
- the first flange and the second flange of the angular sectors comprise bores, each angular sector being attached to an adjacent angular sector by boltwork positioned, on the one hand, in the bores of the first lateral flange of the angular sector and, on the other hand, in the bores of the second lateral flange of the adjacent angular sector;
- the slots directed radially outward are positioned between two bores;
- the first seal is made of elastomer, for example a cold-vulcanizing elastomer.

According to a second aspect, the invention proposes a manufacturing method of a turbomachine fan casing of composite material with the mold according to any one of the preceding features, the method comprising the following steps:
- winding a fibrous preform of the fan casing around the mandrel;
- assembling the plurality of counter-mold angular sectors on the external contour of the mandrel by attaching the first lateral flange of the angular sectors to the second lateral flange of an adjacent angular sector;
- densifying the fibrous preform by injection of a precursor material of a matrix of the composite material into the mold;
- polymerizing the precursor material to obtain the matrix of the composite material;
- withdrawing the plurality of angular sectors;
- de-molding the fan casing.

BRIEF DESCRIPTION OF THE DRAWINGS

Other features and advantages of the present invention will be revealed by the description made below, with reference to the appended drawings that illustrate an exemplary embodiment free of any limiting character. In these figures:

FIG. 4 shows schematically the different steps of a manufacturing method of a fan casing of composite material.

DETAILED DESCRIPTION OF THE INVENTION

Figure 1:
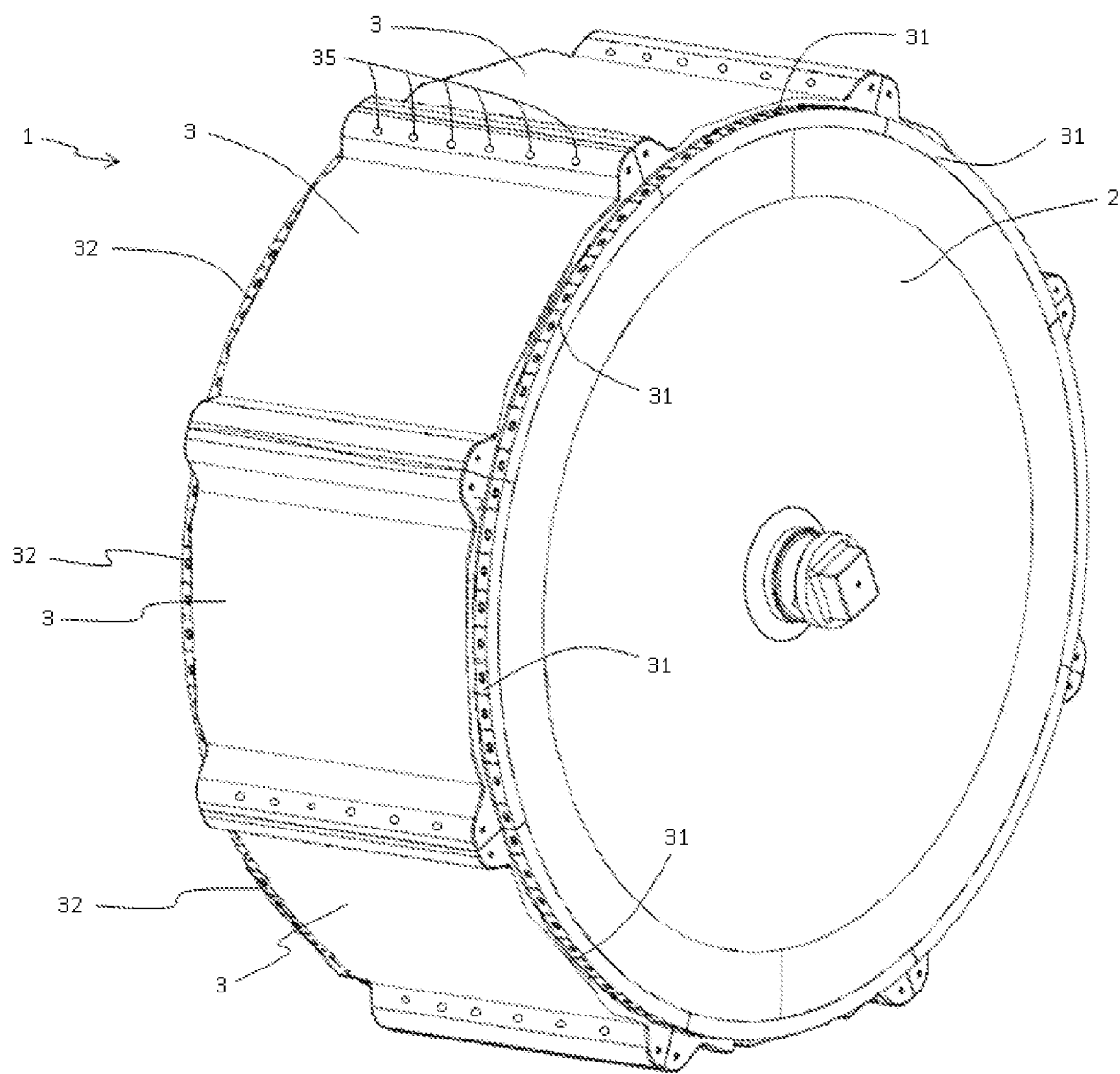
FIG. 1 is a schematic view of a mold for manufacturing of a turbomachine fan casing of composite material.

As illustrated in FIGS. 1, 2, 3 and 4, a mold 1 for manufacturing a turbomachine fan casing of composite material comprises a mandrel 2 around which a fibrous preform of the fan casing is wound.

The mold 1 is intended to be used for impregnation by an RTM ("Resin Transfer Molding") type process of the fibrous preform.

The fibrous preform can be created by two-dimensional weaving of fibers (2D weaving) or preferably by three-dimensional weaving of fibers (3D weaving).

What is meant here by "three-dimensional weaving" or "3D weaving" or "multilayer weaving" is a weaving mode by which at least some of the weft thread connect the warp threads over several layers of warp, or conversely, according to a weave corresponding to a weaving pattern, said weaving pattern being able to be selected in particular among one of the following weaving patterns: interlock, multi-plain, multi-satin and multi-twill.

What is meant here by "two-dimensional weaving" or "2D weaving" is a conventional weaving mode by which each warp thread passes from one side to the other of threads of a single weft layer.

The fibrous preform can be created from carbon fibers, from glass fibers, from aramid fibers, or even from ceramic fibers.

The outer wall of the mandrel 2 around which the fibrous preform is wound has a profile which corresponds to the profile of the fan casing to be manufactured.

The mold 1 also comprises a plurality of counter-mold angular sectors 3 which are assembled removably on the external contour of the mandrel 2. Once assembled on the external contour of the mandrel 2, the angular sectors 3 close the mold 1 and compress the fibrous preform.

The compression of the fibrous preform by the angular sectors 3 allows compacting the preform to the desire thickness and to obtain the desired volume density of fibers in the fan casing.

In order to attach the angular sectors 3 to the mandrel 2, the mandrel 2 comprises an upstream flange 21 positioned at a front end of the mandrel 2, and a downstream flange 22 positioned at a rear end of the mandrel 2, and each angular sector 3 comprises, on the one hand, a front flange 31 which is configured to cooperate with the upstream flange 21, and on the other hand a rear flange 32 which is configured to cooperate with the downstream flange 22.

In the variant illustrated in FIGS. 1 to 4, the front flange 31 and the rear flange 32 of the angular sectors 3 are respectively attached to the upstream flange 21 and the downstream flange 22 by boltwork which is positioned in the bores formed in said front flange 31, rear flange 32, upstream flange 21 and downstream flange 22.

Moreover, the angular sectors 3 are attached to one another, each angular sector 3 being attached to the two angular sectors adjacent to it.

Each angular sector 3 comprises a first lateral flange 33 which is positioned at the first end of the angular sectors 3 and a second lateral flange 34 which is positioned at a second end of said angular sectors 3, the second end being opposite to the first end.

For each angular sector 3, the first lateral flange 33 is configured to cooperate with the second lateral flange 34 of the adjacent angular sector 3, and thus the second lateral flange 34 is configured to cooperate with the first lateral flange 33 of the other adjacent angular sector 3.

Thus, to attach the plurality of angular sectors 3 to the contour of the mandrel 2, each angular sector 3 is attached to the following elements:
- the front flange 31 of the angular sector 3 is attached to the upstream flange 21 of the mandrel 2;
- the rear flange 32 of the angular sector 3 is attached to the downstream flange 22 of the mandrel;
- the first lateral flange 33 of the angular sector 3 is attached to the second lateral flange 34 of the first adjacent angular sector 3;
- the second lateral flange 34 of the angular sector 3 is attached to the first lateral flange 33 of the second adjacent angular sector 3.

The fact that the angular sectors 3 are directly attached to one another, and not with an intermediate part positioned between each angular sector, allows reinforcing the stiffness of the mold 1 at the connection between the angular sectors 3, and thus limits the deformation of the mold at the connection between the angular sectors 3.

In order to attach the first lateral flange 33 and the second lateral flange 34, said first lateral flange 33 and second lateral flange 34 comprise bores 35 which allow the passage of boltwork.

In order to ensure sealing between the different angular sectors 3, a first groove 36 is formed in at least one of the first lateral flange 33 and the second lateral flange 34.

More precisely, the first groove 36 is formed in the flat portion of the first lateral flanges 33 and/or of the second lateral flange 34 which is supported against the complementary flat portion of the second lateral flange 34 or of the first lateral flange 33 of the adjacent angular sector 3.

A first seal 5 is positioned inside the first groove 36, said first seal 5 thus being compressed between, on the one hand, the first lateral flange 33, and on the other hand the second lateral flange 34, thus allowing sealing the connection between the angular sectors 3. The first seal 5 is not shown in FIGS. 3a and 3b so as to leave the first groove 36 visible.

The first seal 5 can be made of an elastomer which is a material suited to the stresses encountered by the first seal 5, and particularly a cold-vulcanizing (or RTV for "Room Temperature Vulcanizing") elastomer, such as for example a cold-vulcanizing silicone, thus offering good resistance to the stresses to which the first seal 5 is subjected, as well as simplicity of use.

Figure 2:
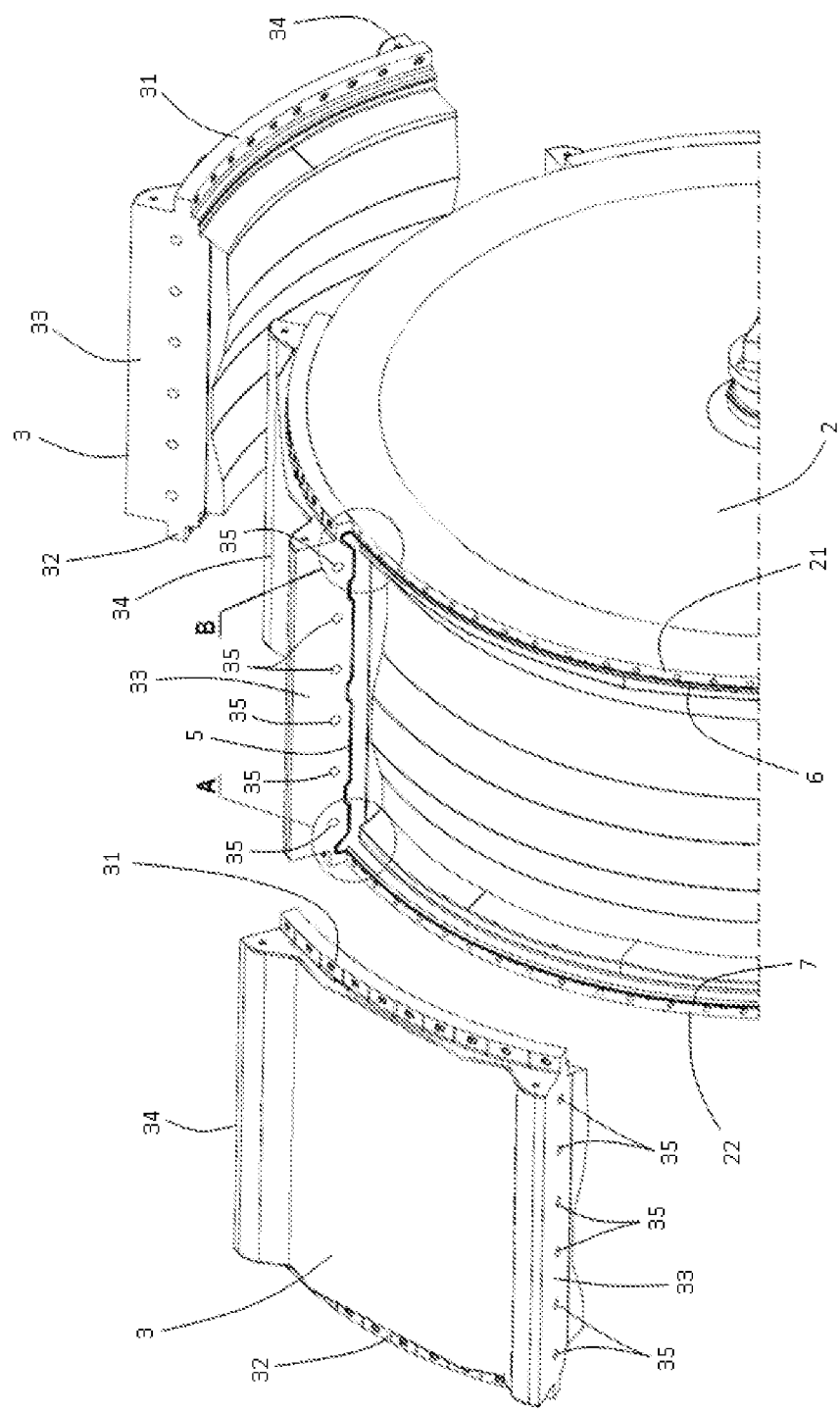
FIG. 2 is a schematic view of the cooperation between the adjacent angular sectors of the mold of FIG. 1.

In the variant embodiment illustrated in FIG. 2, the first groove 36 is not formed on all the angular sectors 3, but rather on only part of said angular sectors 3.

More precisely, in the variant illustrated in FIG. 2, the mold 1 one comprises, on the one hand, a first group of angular sectors 3 for which a first groove 36 is formed both on the first lateral flange 33 and on the second lateral flange 34, and on the other hand a second group of angular sectors 3 for which the first lateral flange 33 and the second lateral flange 34 are smooth, i.e. the first lateral flange 33 and the second lateral flange 34 have no first groove 36.

One angular sector 3 of the first group is positioned between two angular sectors 3 of the second group. Thus, in this variant, the sealing between the different angular sectors 3 is obtained in the following manner;

the first seal 5 positioned in the first groove 36 formed in the first lateral flange 33 of the angular sectors 3 of the first group is compressed between, on the one hand, the first lateral flange 33 of the angular sectors 3 of the first group and, on the other hand, the second lateral flange 34 of the angular sectors 3 of the second group;

the first seal 5 positioned in the first groove 36 formed in the second lateral flange 34 of the angular sectors 3 of the first group is compressed between, on the one hand, the second lateral flange 34 of the angular sectors 3 of the first group and, on the other hand, the first lateral flange 33 of the angular sectors 3 of the second group.

According to another possible variant, the first groove 36 can be formed on the first lateral flange 33 of each angular sector 3, so that the first seal 5 is compressed between the first lateral flange 33 and the second lateral flange 34, the second lateral flange 34, for its part, being smooth. It should be noted that, equivalently, the first groove 36 can be formed in the second lateral flange 34 of each angular sector 3 while the first lateral flange 33 is smooth. By "smooth" it is also understood here that the first lateral flange 33 or the second lateral flange 34 does not have the first groove 36.

In order to ensure the sealing between the mandrel 2 and the angular sectors 3, the upstream flange 21 of the mandrel 2 comprises a second groove 23 and the downstream flange 22 of the mandrel 2 comprises a third groove 24.

The second groove 23 is an annular groove which runs on the contour of the upstream flange 21, and more precisely on the flat surface of the upstream flange 21 which comes into contact with the complementary flat surface of the front flange 31 of the angular sectors 3.

The third groove 24 is also an annular groove which runs on the contour of the downstream flange 22, and more precisely on the flat surface of the downstream flange 22 which comes into contact with the complementary flat surface of the rear flange 32 of the angular sectors 3.

A second seal 6 is positioned inside the second groove 23, and a third seal 7 is positioned inside the third groove 24.

The second seal 6 is configured to be compressed between the upstream flange 21 of the mandrel 2 and the front flange 31 of the angular sectors 3, thus allowing ensuring the sealing of the attachment between the upstream flange 21 of the mandrel 2 and the front flange 31 of the angular sectors 3.

The third seal 7 is, for its part, configured to be compressed between the downstream flange 22 off the mandrel 2 and the rear flange 32 of the angular sectors 3, thus allowing ensuring the sealing of the attachment between the downstream flange 22 of the mandrel 2 and the rear flange 32 of the angular sectors 3.

The second seal 6 and the third seal 7 can be made of elastomer, which is a material suited to the stresses encountered by the second seal 6 and the third seal 7. The second seal 6 and the third seal 7 can be made of cold-vulcanizing (or RTV for "room temperature vulcanizing") elastomer, and particularly of cold-vulcanizing silicone.

Figure 3A:
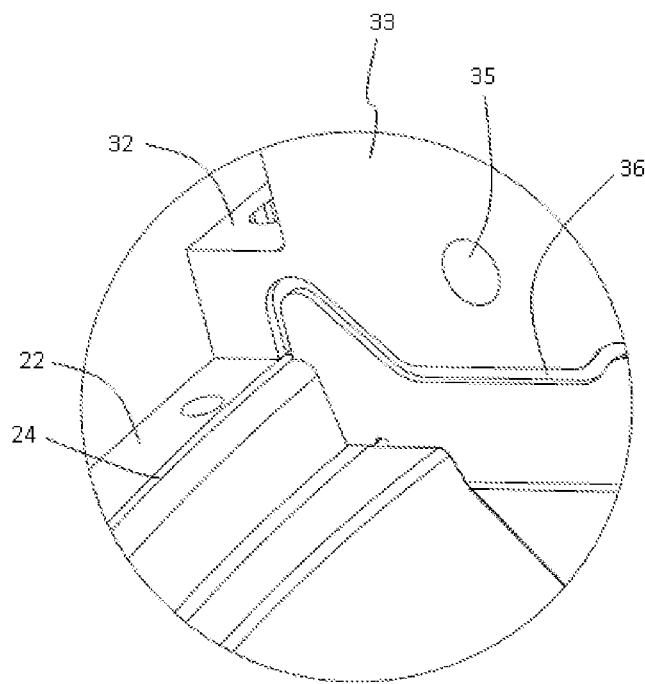
FIG. 3a is a more precise view of the zone A of FIG. 2, the seal not being shown.
Figure 3B:
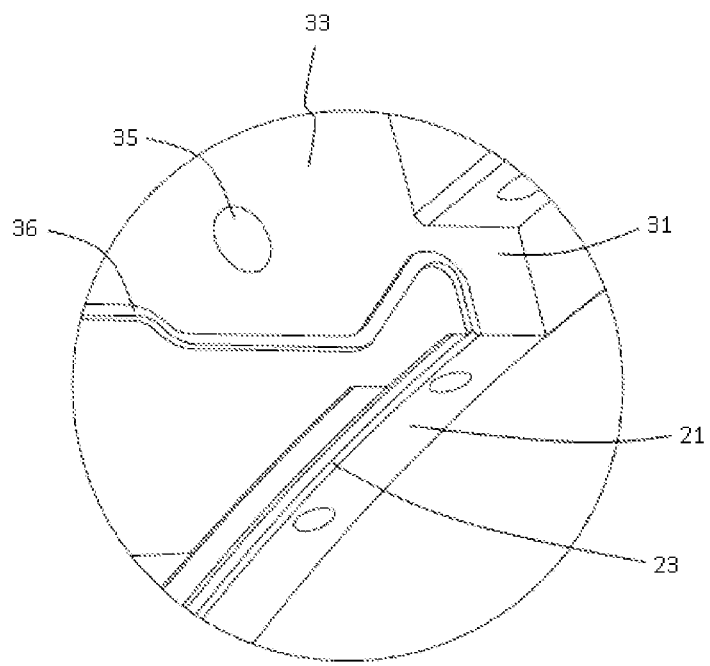
FIG. 3b is a more precise view of the zone B of FIG. 2, the seal not being shown.

As shown in detail in FIGS. 3a and 3b, when an angular sector 3 is attached to the mandrel 2, the first groove 36 formed in the first lateral flange 34 leads, on the one hand, into the third groove 23 formed in the upstream flange 21, and on the other hand into the third groove 24 formed in the downstream flange 22.

The fact that the first groove 36 leads into the second groove 23 and the third groove 24 allows ensuring the continuity of the sealing.

Moreover, as illustrated in FIG. 2, the first groove 36 comprises an undulated shape, thus allowing limiting the risk of the first seal 5 leaving said first groove 36.

The undulated shape of the first groove 36 is advantageously a crenelated shape, said first groove 36 comprising slots directed radially inward, and slots directed radially outward. A crenelated shape of this type allows limiting the risk of the first seal 5 leaving the first groove 36.

It is understood here that slot directed radially inward means a portion of the first groove 36 in which the first groove 36 approaches the mandrel 2, and slot directed radially outward means here a portion of the first groove 36 in which the first groove 36 go away from the mandrel 2.

As illustrated in FIG. 2, the slots directed radially outward from the first groove 36 can be advantageously positioned between two bores 35.

The mold 1 can be used in order to implement the manufacturing method of the fan casing of composite material as illustrated in FIG. 4, the method comprising the following steps:

E1: winding the fan casing fibrous preform around the mandrel 2;

E2: assembling the plurality of counter-mold angular sectors 3 on the exterior contour of the mandrel 2 by attaching the first lateral flange 33 of the angular sectors 3 to the second lateral flange 34 of an adjacent angular segment 3. The angular sectors 3 are also attached to the mandrel 2 by attaching the front 31 and rear 32 flanges of the sectors 3 to the upstream 21 and downstream 22 flanges of the mandrel 2;

E3: densifying the fibrous preform by injection of a precursor material of a matrix of the composite material into the mold 1, the mold 1 comprising injection openings for the injection of said precursor material;

E4: polymerizing the precursor material to obtain the matrix of the composite material;

E5: withdrawing the plurality of angular sectors 3, this step being accomplished by decoupling the first lateral flanges 33 from the second lateral flanges 34, the front flanges 31 from the upstream flange 21, as well as the rear flanges 32 from the downstream flange 32;

E6: de-molding the fan casing.

The invention claimed is:

1. A mold for the manufacture of a turbomachine fan casing of composite material comprising:
    a mandrel around which a fibrous preform of the fan casing is intended to be wound;
    a plurality of counter-mold angular sectors assembled on an external contour of the mandrel, which are intended to close the mold and to compact the fibrous preform wound on the mandrel;
    wherein each counter-mold angular sector comprises a first lateral flange which is positioned at the first end of the counter-mold angular sectors, and a second lateral flange which is positioned at a second end of the counter-mold angular sectors and which is opposite to the first end, the first lateral flange and the second lateral flange being configured to cooperate respectively with the second lateral flange and the first lateral flange of adjacent counter-mold angular sectors,
at least one counter-mold angular sector comprising a first groove formed in at least one of the first lateral flange and the second lateral flange, a first seal being positioned in said first groove, said first seal being configured to be compressed between the first lateral flange and the second lateral flange of two adjacent counter-mold angular sectors wherein the first groove is crenelated, the first groove comprising a plurality of crenels directed radially inward and a plurality of crenels directed radially outward.

2. The mold according to claim 1, wherein each counter-mold angular sector comprises a front flange and a rear flange which are configured to cooperate respectively with an upstream flange and a downstream flange of the mandrel, the upstream flange and the downstream flange comprising respectively a second groove and a third groove, a second seal and a third seal being respectively positioned in the second groove and the third groove, said second seal being configured to be compressed between the upstream flange of the mandrel and the front flange of the counter-mold angular sectors, said third seal being configured to be compressed between the downstream flange of the mandrel and the rear flange of the counter-mold angular sectors, the first groove leading into the second groove and into the third groove.

3. The mold according to claim 1, wherein the mold comprises a first group of counter-mold angular sectors for which the first groove is formed on the first lateral flange and on the second lateral flange, and a second group of counter-mold angular sectors for which the first lateral flange and the second lateral flange are smooth, one counter-mold angular sector of the first group being positioned between two counter-mold angular sectors of the second group.

4. The mold according to claim 1, wherein the first groove is formed on the first lateral flange of each counter-mold angular sector.

5. The mold according to claim 1, wherein the first groove comprises an undulated shape.

6. The mold according to claim 1, wherein the first flange and the second flange of the counter-mold angular sectors comprise bores, each counter-mold angular sector being attached to an adjacent counter-mold angular sector by boltwork positioned in the bores of the first lateral flange of the counter-mold angular sector and in the bores of the second lateral flange of the adjacent counter-mold angular sector.

7. The mold according to claim 6, wherein the crenels directed radially outward are positioned between two bores.

8. The mold according to claim 1, wherein the first seal is made of elastomer.

9. The mold according to claim 8, wherein the elastomer is a cold-vulcanizing elastomer.

10. The mold according to claim 1, wherein the plurality of crenels of the first groove comprises at least three crenels directed radially outward and at least three crenels directed radially inward.

11. A manufacturing method of a turbomachine fan casing of composite material with the mold, according to claim 1, the method comprising:
    winding a fibrous preform of the fan casing around the mandrel;
    assembling the plurality of counter-mold angular sectors on the external contour of the mandrel by attaching the first lateral flange of the counter-mold angular sectors to the second lateral flange of an adjacent counter-mold angular sector;
    densifying the fibrous preform by injection of a precursor material of a matrix of the composite material into the mold;
    polymerizing the precursor material to obtain the matrix of the composite material;
    withdrawing the plurality of counter-mold angular sectors;
    de-molding the fan casing.

* * * * *